United States Patent
Farivar et al.

(10) Patent No.: US 10,937,171 B2
(45) Date of Patent: *Mar. 2, 2021

(54) GENERATING SYNTHETIC IMAGES AS TRAINING DATASET FOR A MACHINE LEARNING NETWORK

(71) Applicant: Capital One Services, LLC, McLean, VA (US)

(72) Inventors: Reza Farivar, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/407,752

(22) Filed: May 9, 2019

(65) Prior Publication Data
US 2019/0333226 A1 Oct. 31, 2019

Related U.S. Application Data

(63) Continuation of application No. 15/963,742, filed on Apr. 26, 2018, now Pat. No. 10,332,261.

(51) Int. Cl.
*G06T 7/149* (2017.01)
*G06T 7/174* (2017.01)
(Continued)

(52) U.S. Cl.
CPC ............. *G06T 7/149* (2017.01); *G06N 3/08* (2013.01); *G06N 3/088* (2013.01); *G06N 20/00* (2019.01);
(Continued)

(58) Field of Classification Search
CPC ......... G06T 7/149; G06T 7/174; G06F 15/18; G06N 3/088; G06N 3/08
See application file for complete search history.

(56) References Cited

U.S. PATENT DOCUMENTS 10,332,261 B1 * 6/2019 Farivar .................... B60M 1/28
2011/0299776 A1 12/2011 Lee et al.
(Continued)

OTHER PUBLICATIONS

Debidatta D., et al., "Cut, Paste and Learn: Surprisingly Easy Synthesis for Instance Detection", International Conference on Computer Vision (ICCV), IEEE, Oct. 22, 2017, pp. 1310-1319, XP033282989, [Retrieved on Dec. 22, 2017].
(Continued)

*Primary Examiner* — David F Dunphy
(74) *Attorney, Agent, or Firm* — Harrity & Harrity, LLP

(57) ABSTRACT

A method may include identifying a first image for training a deep learning network, wherein the first image includes at least one target object associated with at least one location in the first image, and wherein the first image is associated with a mask image; determining a set of deformations to create a training set of deformed images, wherein the training set is to be used to train the deep learning network; generating the training set of deformed images by applying the set of deformations to the first image; and generating a set of deformed mask images by applying the set of deformations to the mask image, wherein each deformed image of the training set of deformed images is associated with a respective mask image to identify the location of the at least one target object in each deformed image.

20 Claims, 6 Drawing Sheets

(51) Int. Cl.
  *G06N 3/08* (2006.01)
  *G06N 20/00* (2019.01)
  *G06T 7/11* (2017.01)
  *G06T 7/194* (2017.01)
(52) U.S. Cl.
  CPC .............. *G06T 7/11* (2017.01); *G06T 7/174* (2017.01); *G06T 7/194* (2017.01); *G06T 2207/20081* (2013.01); *G06T 2207/20084* (2013.01); *G06T 2207/30176* (2013.01)

(56) References Cited

U.S. PATENT DOCUMENTS

| | | |
|---|---|---|
| 2014/0306953 A1 | 10/2014 | Morato et al. |
| 2017/0069081 A1* | 3/2017 | Gluncic .................. A61B 6/12 |
| 2017/0116498 A1* | 4/2017 | Raveane .................. G06N 3/10 |
| 2018/0137551 A1 | 5/2018 | Zheng et al. |

OTHER PUBLICATIONS

Extended European Search Report for Application No. EP19168619.5, dated Sep. 27, 2019, 9 pages.

Jesus M.B., et al., "Deep Fully Convolutional Networks with Random Data Augmentation for Enhanced Generalization in Road Detection," 2017 IEEE 20th International Conference on Intelligent Transportation Systems (ITSC), Oct. 16, 2017, pp. 366-371, XP033338549, [Retrieved on Mar. 14, 2018].

Konstantinos R., et al., "Image-Based Synthesis and Re-synthesis of Viewpoints Guided by 3D Models," IEEE Conference on Computer Vision and Pattern Recognition, Jun. 23, 2014, pp. 3898-3905, XP032649298, [Retrieved on Sep. 24, 2014].

Co-pending U.S. Appl. No. 15/963,742, filed Apr. 26, 2018.

Georgakis G., et al., "Synthesizing Training Data for Object Detection in Indoor Scenes," Sep. 18, 2017, 9 pages.

Gupta A., et al., "Synthetic Data for Text Localisation in Natural Images," Apr. 22, 2016, 10 pages.

Krishnan P., et al., "Generating Synthetic Data for Text Recognition," Aug. 15, 2016, 5 pages.

Le T.A., et al., "Using Synthetic Data to Train Neural Networks in Model-Based Reasoning," Mar. 2, 2017, 8 pages.

Simard P.Y., et al., "Best Practices for Convolutional Neural Networks Applied to Visual Document Analysis," Aug. 1, 2003, 6 pages.

* cited by examiner

GENERATING SYNTHETIC IMAGES AS TRAINING DATASET FOR A MACHINE LEARNING NETWORK

RELATED APPLICATION

This application is a continuation of U.S. patent application Ser. No. 15/963,742, filed Apr. 26, 2018, which is incorporated herein by reference.

BACKGROUND

Machine learning is a field of computer science that aims to provide computer systems with the ability to "learn" (i.e., progressively improve performance on a specific task) with data, without being explicitly programmed. Approaches for machine learning include decision tree learning, artificial neural networks (e.g., deep learning networks, support vector machines, genetic algorithms, and others.

SUMMARY

A method performed by a device may include identifying a first image for training a deep learning network to perform segmentation of images, wherein the first image includes at least one target object associated with at least one location in the first image, and wherein the first image is associated with a mask image that indicates the at least one location; determining a set of deformations to create a training set of deformed images based on the first image, wherein the training set is to be used to train the deep learning network; generating the training set of deformed images by applying the set of deformations with regard to the first image; and generating a set of deformed mask images by applying the set of deformations with regard to the mask image, wherein each deformed image of the training set of deformed images is associated with a respective mask image, of the set of deformed mask images, to identify the location of the at least one target object in each deformed image.

A device may include memory; and one or more processors coupled to the memory, the memory and the one or more processors configured to: identify a first image for training a deep learning network to perform segmentation of images, wherein the first image includes at least one target object associated with at least one location in the first image, and wherein the first image is associated with a mask image that indicates the at least one location; determine a set of deformations to create a training set of deformed images based on the first image, wherein the training set is to be used to train the deep learning network; automatically generate the training set of deformed images by applying the set of deformations with regard to the first image; automatically generate a set of deformed mask images by applying the set of deformations with regard to the mask image, wherein each deformed image of the training set of deformed images is associated with a respective mask image, of the set of mask images, to identify the location of the at least one target object in each deformed image; and train the deep learning network, using the training set of deformed images and the set of deformed mask images, to perform segmentation of images.

A non-transitory computer-readable medium may store one or more instructions that, when executed by one or more processors of a device, cause the one or more processors to: identify a set of first images, wherein the set of first images includes respective target objects associated with respective locations in the set of first images, and wherein the set of first images is associated with a set of mask images that indicates the respective locations; determine a set of deformations to create a training set of deformed images based on the set of first images, wherein the training set is to be used to train a deep learning network to perform segmentation of images; render the training set of deformed images by applying the set of deformations with regard to the set of first images; and generate a set of deformed mask images by applying the set of deformations with regard to the set of mask images, wherein each deformed image, of the training set of deformed images, is associated with a respective mask image, of the set of deformed mask images, to identify the location of a target object, of the respective target objects, in each deformed image; and train the deep learning network, using the training set of deformed images and the set of deformed mask images, to perform segmentation of images.

DETAILED DESCRIPTION

Figure 1A:
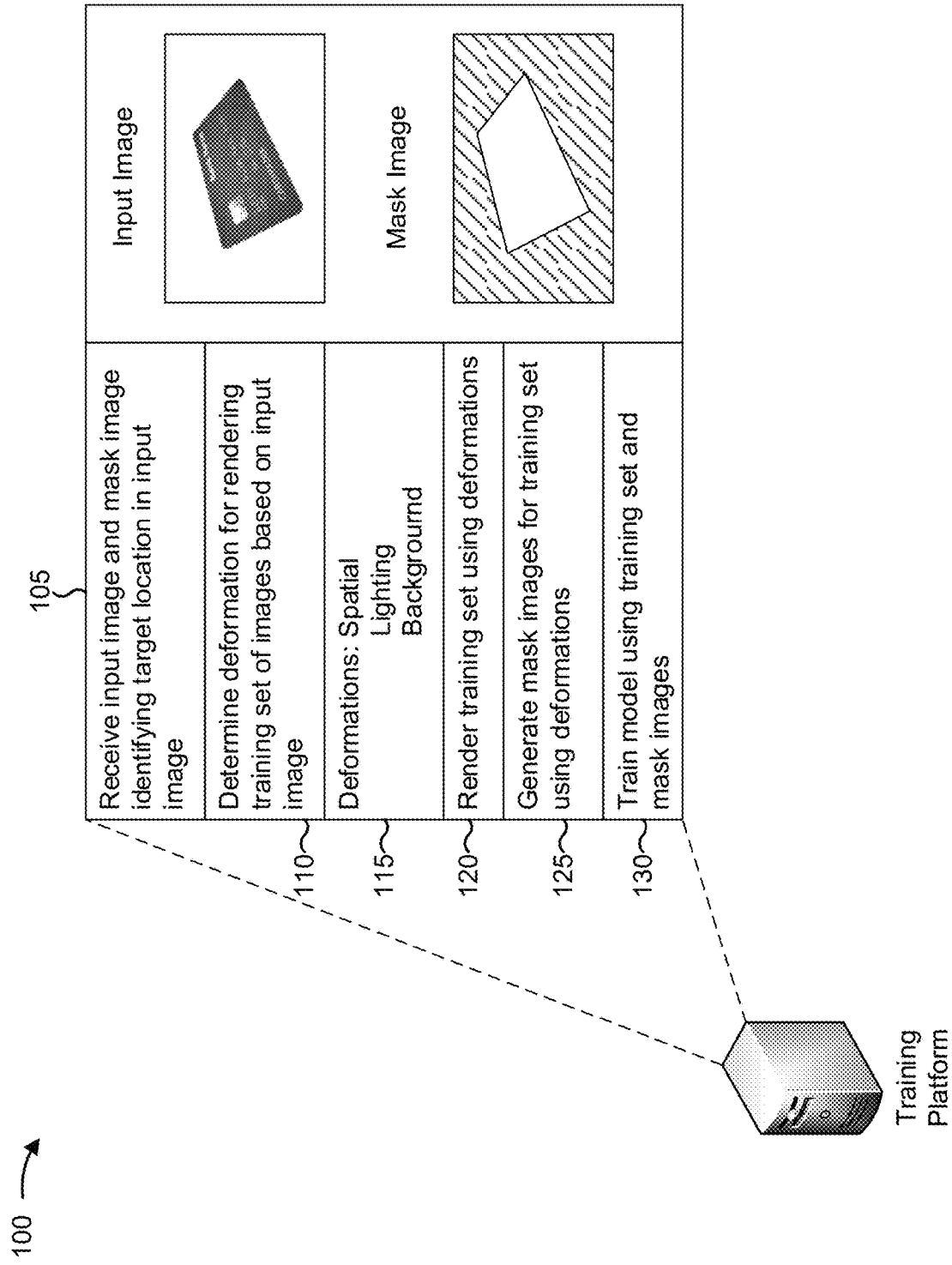
FIGS. 1A and 1B are diagrams of an overview of an example implementation described herein.

The following detailed description of example implementations refers to the accompanying drawings. The same reference numbers in different drawings may identify the same or similar elements.

Neural networks, such as deep learning networks, have proven to be quite capable in solving many tasks that are challenging to solve using traditional algorithmic approaches. One example of such a task is computer vision. Computer vision includes methods for extracting usable data from images, such as images obtained from the Internet, images obtained from a smartphone camera, and/or the like. Examples of application of computer vision include the extraction of information from a check to deposit the check using a smartphone, the segmentation of images to identify relevant portions of the images, the extraction of information from road signs for automatic driving systems, and the extraction of credit card information from an image of a credit card.

A deep learning network may be trained using a training set of data using a supervised (e.g., classification) approach. For example, in the case of computer vision, a training set may include images that are paired with information identifying a relevant portion of the images or relevant information to be extracted from the images. For example, the training set may include images and mask images, wherein the mask images include bitmaps that identify the relevant portion or relevant information of the images. In some implementations, the training set may be referred to as including data records (e.g., the images) and labels for the data records (e.g., the mask images).

Training a deep learning network is data-intensive. For example, the deep learning network may consume thousands, tens of thousands, or hundreds of thousands of data records and labels to reach a satisfactory level of performance. It is labor-intensive to generate labels for large volumes of data records. Furthermore, in some cases, there may be a shortage of data records in the first place. For example, there may not be many acceptable images, let alone corresponding mask images, to train a deep learning network to perform computer vision tasks at an acceptable level of accuracy.

Some implementations described herein may use an input image, and an input mask image for the image, to generate a training set of images and corresponding mask images. For example, some implementations described herein may automatically apply deformations (e.g., spatial deformations, different backgrounds, different lighting, or any other deformation) to the input image, and may render output images with the deformations. Furthermore, some implementations described herein may apply the same deformations (where appropriate) to the corresponding mask image to generate mask images that are paired with the output images. For example, if a spatial deformation is applied to the input image, the same spatial deformation may be applied to the mask image, so that the deformed mask image still identifies the relevant portion of the deformed input image.

In this way, thousands, tens of thousands, or hundreds of thousands of images can be generated for the training set. As a result, accuracy of the deep learning network may be improved by automatically increasing a size of a training set for the deep learning network. Thus, processor resources may be conserved that would otherwise be used to handle inaccurate results or uncertain determinations by the deep learning network. Furthermore, some implementations described herein increase the size of the training set with minimal human invention, and can create a training set of a size that would be difficult or impossible for a human actor to achieve (e.g., based on the volume of mask images that would have to be generated for the deformed images). For example, some implementations described herein automate a process of generating images and corresponding mask images, that was previously achieved by a human actor manually specifying relevant regions of the images, using a rigorous and technical approach (e.g., the automatic determination of deformations for an input image, the rendering of large sets of deformed images using those deformations, and the generation of corresponding mask images for the deformed images by applying the same deformations) that was not previously performed by a human actor or feasible for a human actor to perform.

The implementations described herein are primarily described in the context of a deep learning network. However, the implementations described herein are not limited to those involving the training of a deep learning network, and may be applied with regard to any machine learning algorithm for training any model.

Figure 1B:
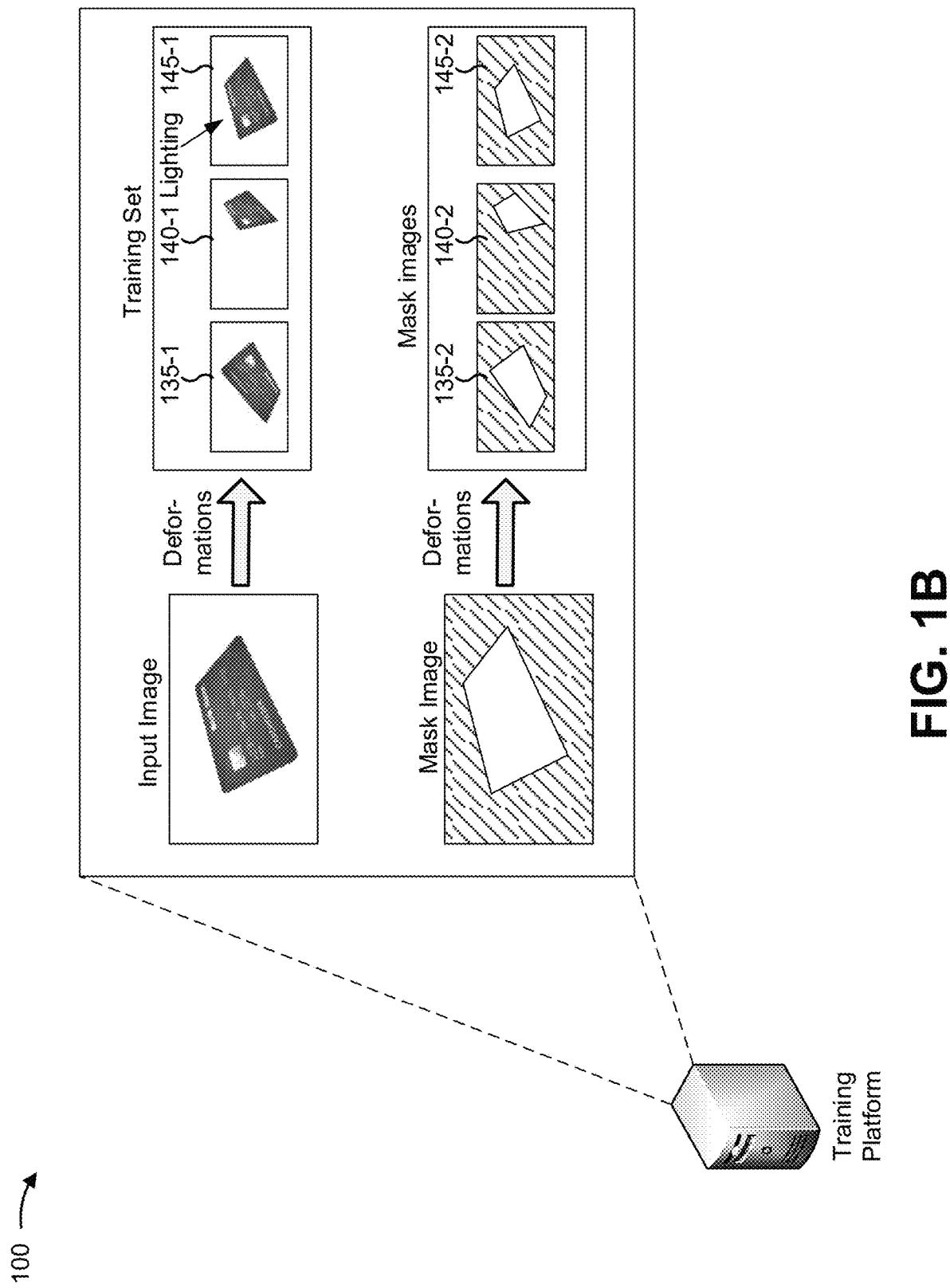

FIGS. 1A and 1B are diagrams of an overview of an example implementation 100 described herein. FIGS. 1A and 1B show a training platform, which may be the training platform 220 described in connection with FIG. 2.

As shown by reference number 105, the training platform may receive an input image and a mask image that identifies a target location in the input image. For example, the input image may include at least one target object. Here, the target object is a charge card. However, the implementations described herein can be applied for any type or number of target objects. The mask image may identify a target location in the input image. For example, the mask image, when combined with the first image, may indicate the target location in the first image. The target location may correspond to the target object. Here, the target location is a region of the image that includes the charge card. For example, the mask image may use a first bit value or color to identify the target location, and may use a second bit value or color to identify regions of the input image other than the target location.

In some implementations, the input image and the mask image may be used to train a deep learning network to perform segmentation of images. Segmentation is a process for assigning values to each bit of an image to indicate which object each bit represents. For example, performing segmentation on the input image described herein may involve assigning values of "target object" and, perhaps, "not target object," or "charge card" and "not charge card." In some implementations, the target object may include a document or card, such as a banking document, a charge card, a credit card, and/or the like. However, implementations described herein may be applied for any target object.

Implementations described herein are not limited to those involving a single target object. In some implementations, an input image may include multiple target objects. For example, assume that the input image includes three objects: a park bench, a sidewalk, and a newspaper stand. Assume further that the deep learning network is to be trained to assign respective values indicating which regions of the input image include the park bench, the sidewalk, and the newspaper stand. In this case, the training platform may receive the input image and a mask image that includes multiple bit values corresponding to the different objects. Additionally, or alternatively, the training platform may receive multiple mask images, wherein each mask image corresponds to a different object of the three objects. Using a single mask image may conserve processor resources that may be used to deform the three mask images, whereas using multiple mask images may reduce size of the mask images.

In some implementations, the training platform may receive the input image and the mask image from a client device. For example, the client device may receive input specifying the mask image, and may provide the input image and the mask image to the training platform. In some implementations, the training platform may obtain the input image and the mask image. For example, the training platform may obtain the input image and the mask image from a corpus of training data for segmentation. In some implementations, the training platform may obtain a large volume of input images and mask images. For example, some corpuses contain thousands or millions of input images and mask images. In such a case, the training platform may obtain an entirety of the corpus or a part of the corpus. By performing the techniques described herein, the training platform may increase the size of the corpus without human intervention, thereby increasing the effectiveness of the corpus beyond what was possible when the corpus is generated by human actors.

In some implementations, the training platform may receive or obtain an input image, and may provide the input image for generation of the mask image. For example, the training platform may obtain an image of the target object (e.g., using a database of images, using an online image search tool, etc.), and may provide the image of the target object for a user. The user may specify the location in the image of the target object. The training platform may generate the mask image based on the location in the image. In this way, the training platform may obtain an input image and provide the input image for generation of the mask image, which reduces reliance on preexisting databases of input images and mask images.

In some implementations, the input image may be a model. For example, the input image may be a 2D or 3D model used to render the output image using a rendering technique (e.g., rastering, ray tracing, ray casting, etc.). Using a model for the input image may provide more flexibility with regard to deformations that can be applied, and therefore may improve results of the generation of deformed images with regard to training the deep learning network. In some implementations, the input image may be an image file (e.g., .jpg, .gif, .tiff, etc.). Using an image file may conserve processor and storage resources that would otherwise be used to process and store a more complex input image, such as a model.

As shown by reference number 110, the training platform may determine deformations for rendering a training set of images based on the input image. In some implementations, rendering may refer to generating an image based on a 2D or 3D model using a computer program. In some implementations, rendering may refer to applying a deformation to an input image to generate a deformed image. The training platform may determine one or more deformations to be applied with regard to an input image (e.g., an image, a 2D model, a 3D model, etc.) to generate deformed images.

In some implementations, the training platform may determine multiple deformations for a single deformed image. For example, the training platform may determine that two or more deformations are to be applied to generate a single image. In some implementations, the training platform may randomly or pseudorandomly select deformations, which may increase randomness of the training set, thereby improving variation in the training set. In some implementations, the training platform may use a predefined set of deformations for the input image, which conserves processor resources that would be used to determine a random or pseudorandom selection of deformations.

In some implementations, the training platform may determine a deformation based on an input image. For example, assume that an input image can be of a first type (e.g., image file, 2D model, 3D model, etc.) or a second type. In such a case, when the input image is of the first type, the training platform may select a deformation from a set of deformations associated with the first type, and when the input image is of the second type, the training platform may select a deformation from a set of deformations associated with the second type. In this way, processor resources are conserved that would otherwise be used to apply an inappropriate deformation for an input image (e.g., a deformation that would have no effect, a deformation that would render the deformed image unusable, a deformation that is incompatible with an image type, etc.).

As shown by reference number 115, in this case, the deformation may include spatial deformations, lighting deformations, and background deformations, which are each described in turn below. In some implementations, the deformation may be of another type, some of which are provided below as examples.

In some implementations, a deformation may include, for example, a spatial deformation (e.g., rotation, compression, stretching, horizontal deformation, vertical deformation, curving, shearing, magnification, shrinking, or any other spatial modification of the input image).

In some implementations, a deformation may include a background deformation. For example, locations of the image that do not include the target object may be considered a background of the image. Some deformations may replace the background of the image with different content, such as other objects, a pattern, a particular color, a modification to the original background of the image, and/or the like. By deforming the background of the image, detection of the particular object in different backgrounds may be improved.

In some implementations, a deformation may include a lighting deformation. For example, some rendering techniques may provide for modification of lighting used to render the deformed image. This may include, for example, changing a brightness of a light source, changing a position of a light source, changing a direction of a light source, changing a color of a light source, adding or removing a light source, and/or the like. By deforming lighting of the input image, robustness of the training set is improved with regard to different lighting conditions.

In some implementations, a deformation may include, for example, an atmospheric deformation (e.g., making an atmosphere of an image more hazy or less hazy), a color deformation, a deformation of letters or numbers of an image (e.g., changing letters or numbers in the image), adding or removing target objects in an image, moving a target object in the image, adding an object other than a target object in the image, and/or the like.

As shown by reference number 120, the training platform may render the training set using the deformations. For example, the training platform may render a plurality of deformed images, using the deformations, to generate deformed images. In some implementations, the training platform may use a rendering software to render the plurality of images (e.g., Autodesk, V-Ray, Blender, etc.). In some implementations, the training platform may use a rendering technique to render the plurality of images.

In some implementations, the training platform may apply a first deformation to generate a group of deformed images, and then may apply respective second deformations to the group of deformed images to generate the training set. For example, the training platform may use a hierarchical approach wherein a first deformation is applied before a set of second deformations are applied. This may conserve processor resources that would otherwise be used to apply the first deformation separately with regard to each deformed image.

As shown by reference number 125, the training platform may generate mask images for the training set using the deformations. For example, for a particular image, the training platform may apply the same set of deformations to the mask image that is applied to the particular image. For a visual representation of this technique, refer to FIG. 1B.

In some implementations, the training platform may determine whether to apply a particular deformation to a mask image, and may apply the particular deformation to the mask image when the training platform determines that the particular deformation is to be applied to the mask image. The training platform may not apply the particular deformation to the mask image when the training platform determines that the particular deformation is not to be applied to the mask image. For example, some deformations may have no effect on the location of the target object, and thus may have no effect on the mask image. This may include, for example, lighting deformations, atmospheric deformations, and/or the like. By not applying certain deformations to mask images, the training platform conserves processor resources that would otherwise be used to ineffectually apply the deformations to the mask images.

As shown by reference number 130, the training platform may train the model using the training set and the deformed mask images. For example, the training platform may use a machine learning algorithm to train the model (e.g., the deep learning network) using the training set and the deformed mask images. In some implementations, the training platform may provide the training set and the deformed mask images. For example, the training platform may provide the training set and the deformed mask images to another device to train the model. In some implementations, the training platform may provide at least part of the training set and the deformed mask images to a user. For example, the user may provide feedback regarding accuracy or usefulness of the deformed mask images. The training platform may adjust selection of the deformations to be applied based on the feedback. In this way, usefulness of the training set may be improved, thereby conserving processor resources that would otherwise be used to generate less useful deformed images and mask images.

As shown in FIG. 1B, and by reference number 135-1, in a first deformation, the input image is rotated about an axis. As shown by reference number 135-2, the same deformation may be applied to the mask image. As shown by reference number 140-1, in a second deformation, the input image is compressed in a rightward direction. As shown by reference number 140-2, the same deformation may be applied to the mask image.

As shown by reference number 145-1, in a third deformation, a lighting of the input image is changed. In this case, and as shown by reference number 145-2, no deformation may be applied to the mask image. For example, the relevant portion of the input image may be unchanged by this deformation. In this way, processor resources are conserved that would otherwise be used to needlessly apply the deformation to the mask image.

In this way, accuracy of the deep learning network may be improved by automatically increasing a size of a training set for the deep learning network. Thus, processor resources may be conserved that would otherwise be used to handle inaccurate results or uncertain determinations by the deep learning network. Furthermore, some implementations described herein increase the size of the training set with minimal human invention, and can create a training set of a size that would be difficult or impossible for a human actor to achieve (e.g., based on the volume of mask images that would have to be generated for the deformed images). For example, some implementations described herein automate a process of generating images and corresponding mask images, that was previously achieved by a human actor manually specifying relevant regions of the images, using a rigorous and technical approach (e.g., the automatic determination of deformations for an input image, the rendering of large sets of deformed images using those deformations, and the generation of corresponding mask images for the deformed images by applying the same deformations) that was not previously performed by a human actor or feasible for a human actor to perform.

As indicated above, FIGS. 1A and 1B are provided merely as an example. Other examples are possible and may differ from what was described with regard to FIGS. 1A and 1B.

Figure 2:
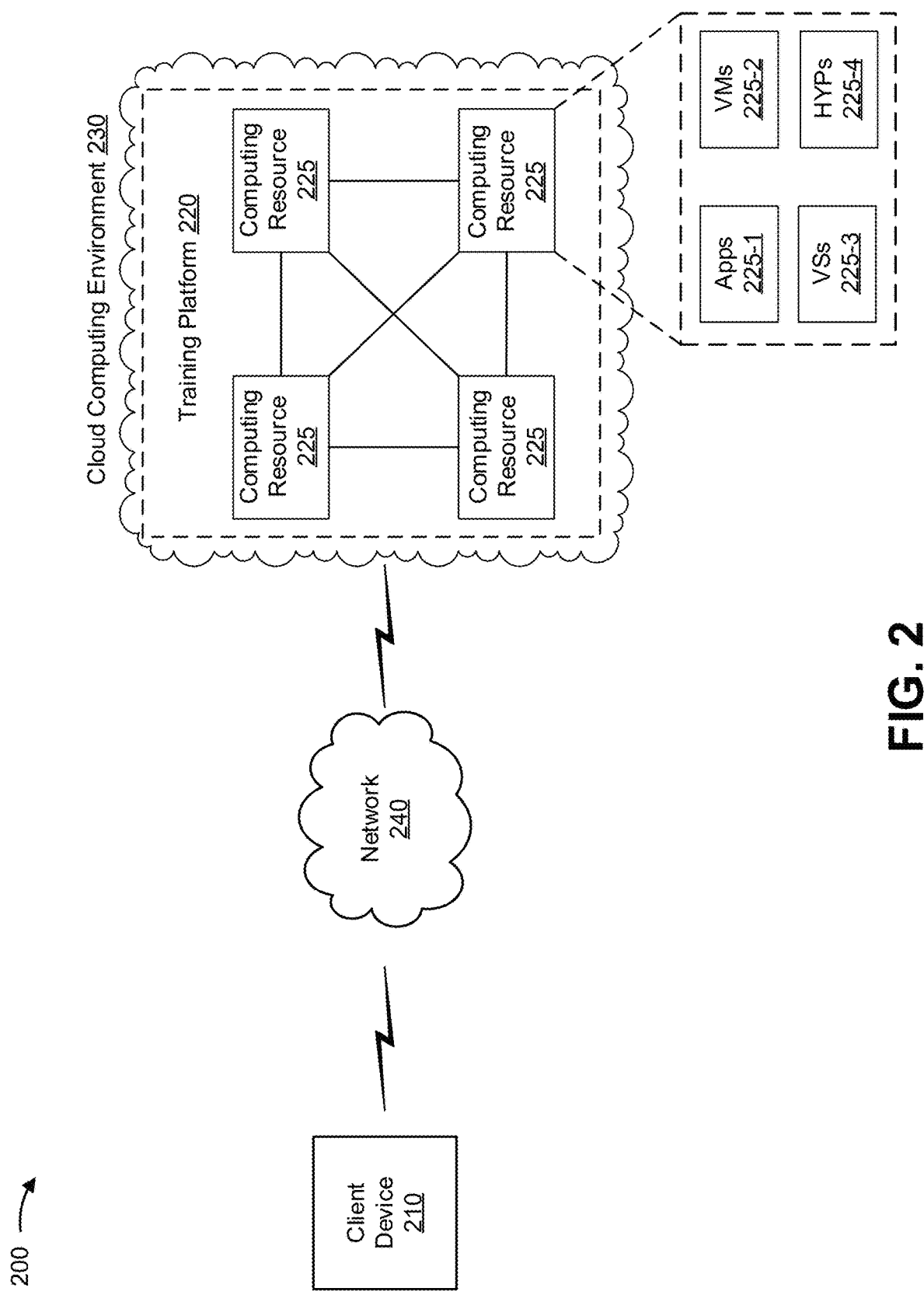
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a training platform 220 which may utilize computing resources provided by cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with images and/or mask images for training a model using machine learning. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Training platform 220 includes one or more devices capable of receiving, storing, generating, processing, and/or providing information associated with images and/or mask images for training a model using machine learning. For example, training platform 220 may include a cloud server or a group of cloud servers. In some implementations, training platform 220 may use efficiently scalable resources of cloud computing environment 230, so that the operations performed by training platform 220 can be scaled Cloud computing environment 230 includes an environment that delivers computing as a service, whereby shared resources, services, etc. may be provided to training platform 220 and/or client device 210. Cloud computing environment 230 may provide computation, software, data access, storage, and/or other services that do not require end-user knowledge of a physical location and configuration of a system and/or a device that delivers the services. As shown, cloud computing environment 230 may include computing resources 225.

Computing resource 225 includes one or more personal computers, workstation computers, server devices, or another type of computation and/or communication device. In some implementations, computing resource 225 may host cloud computing environment 230. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on 210. For example, application 225-1 may include software associated with training platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
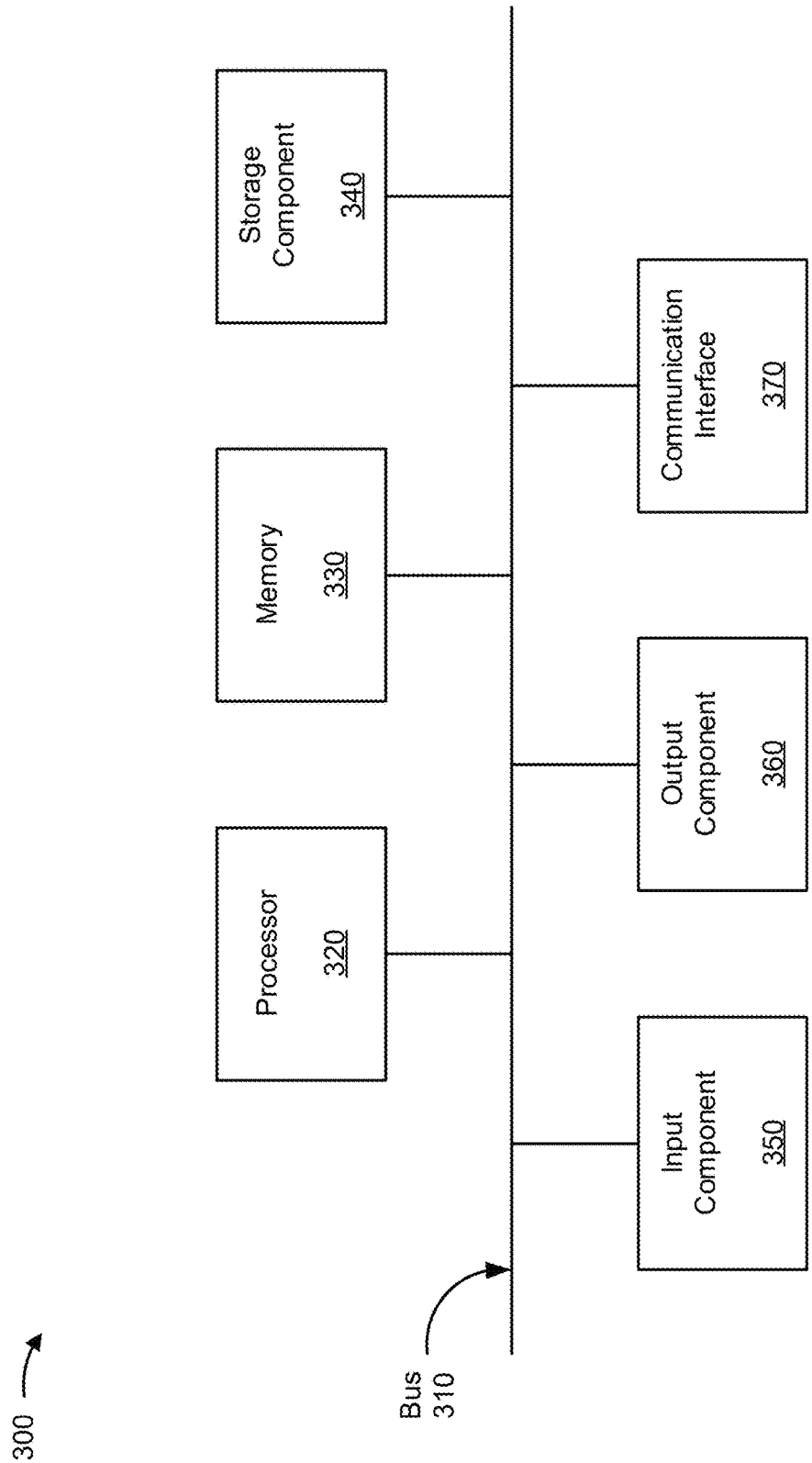
FIG. 3 is a diagram of example components of one or more devices of FIG. 2.

FIG. 3 is a diagram of example components of a device 300. Device 300 may correspond to client device 210 and computing resource 225. In some implementations, client device 210 and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
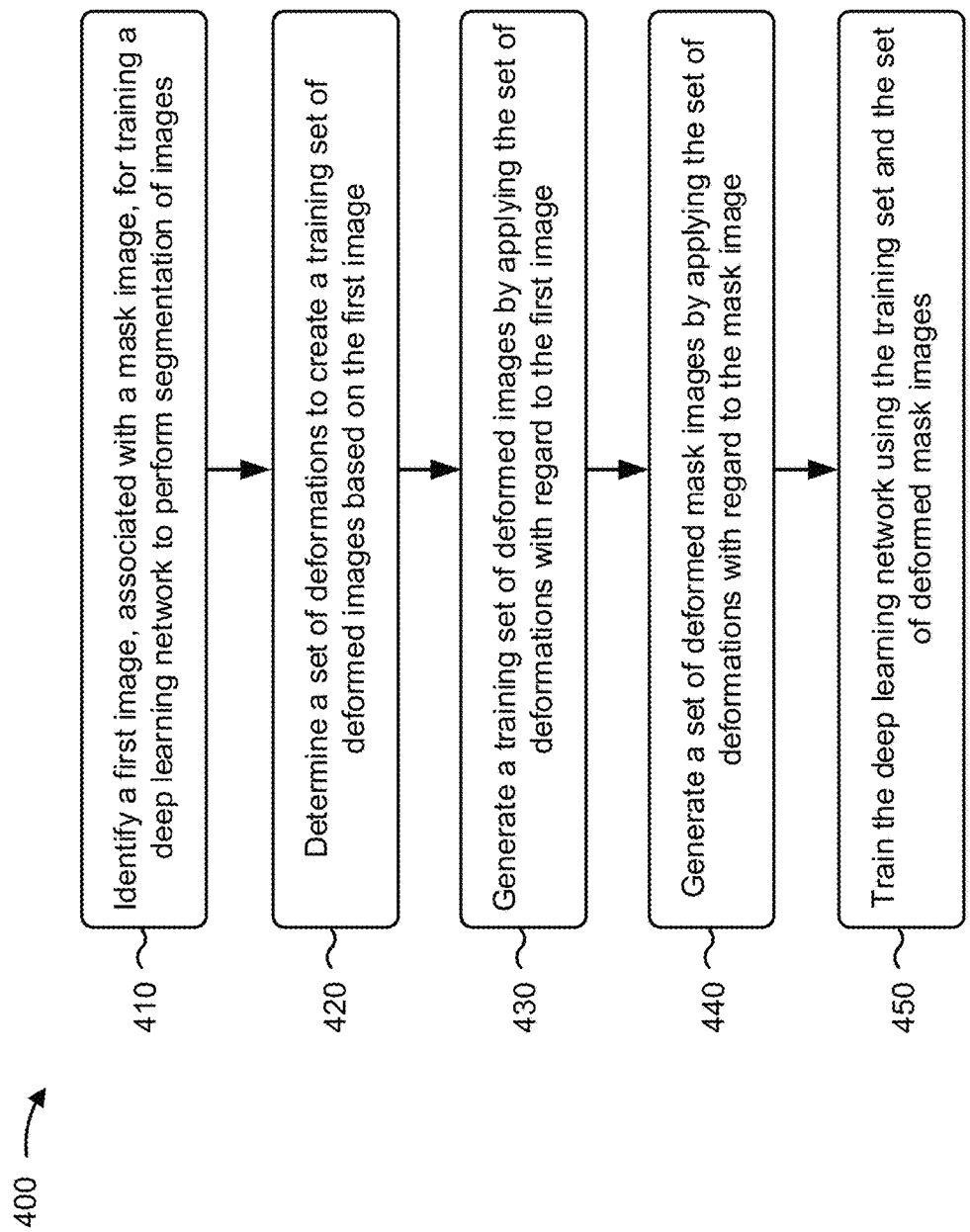
FIG. 4 is a flow chart of an example process for generating synthetic images as a training dataset for a machine learning network.

FIG. 4 is a flow chart of an example process 400 for generating synthetic images as a training dataset for a machine learning network. As used herein, a synthetic image may be synonymous with an output image or deformed image as described in connection with FIGS. 1A and 1B. In some implementations, one or more process blocks of FIG. 4 may be performed by a training platform 220. In some implementations, one or more process blocks of FIG. 4 may be performed by another device or a group of devices separate from or including training platform 220, such as client device 210.

As shown in FIG. 4, process 400 may include identifying a first image for training a deep learning network to perform segmentation of images (block 410). For example, training platform 220 (e.g., using processor 320 and/or the like) may identify (e.g., receive, obtain, generate, etc.) a first image. The first image may include at least one target object associated with at least one location in the first image. The first image may be associated with a mask image that indicates the at least one location. For example, training platform 220 may receive the mask image with the first image, or may receive the mask image separately from the first image.

As shown in FIG. 4, process 400 may include determining a set of deformations to create a training set of deformed images based on the first image (block 420). For example, training platform 220 (e.g., using processor 320 and/or the like) may determine a set of deformations to be applied to the first image to create a training set. The training set may be used to train a deep learning network. For example, the deep learning network may perform segmentation of images to determine locations of objects in the images.

As shown in FIG. 4, process 400 may include generating the training set of deformed images by applying the set of deformations with regard to the first image (block 430). For example, training platform 220 (e.g., using processor 320 and/or the like) may apply the set of deformations with regard to the first image. By applying the set of deformations with regard to the first image, training platform 220 may generate a training set of deformed images. For example, training platform may automatically render the training set based on the first image and using a rendering technique.

As shown in FIG. 4, process 400 may include generating a set of deformed mask images by applying the set of deformations with regard to the mask image (block 440). For example, training platform 220 (e.g., using processor 320 and/or the like) may apply the set of deformations with regard to the mask image. Thus, training platform 220 may generate a set of deformed mask images. In some implementations, training platform 220 may determine that a particular deformation is not to be applied for the mask image (e.g., based on the particular deformation having no effect on the mask image) and may accordingly not apply the particular deformation for the mask image. This conserves processor resources in comparison to applying the particular deformation for the mask image.

As shown in FIG. 4, process 400 may include training a deep learning network, using the training set of deformed images and the set of deformed mask images, to perform segmentation of images (block 450). For example, training platform 220 (e.g., using processor 320 and/or the like) may train a model, such as a deep learning network. Training platform 220 may train the model using a machine learning technique, such as a supervised learning technique. Training platform may train the model using the training set of deformed images and the set of deformed mask images. The model may perform segmentation of images.

Process 400 may include additional implementations, such as any single implementation or any combination of implementations described below.

In some implementations, training platform 220 may generate renderings of the first image based on the set of deformations. In some implementations, the set of deformations includes at least one of: a spatial deformation, a changed lighting configuration, or a changed background. In some implementations, training platform 220 may train the deep learning network to perform segmentation of images using the training set of deformed images and the set of deformed mask images. In some implementations, training platform 220 may perform segmentation of the images using the deep learning network.

In some implementations, the at least one target object includes at least one of a document, a payment card, or an alphanumeric value. In some implementations, the mask image is a bitmap identifying a region associated with the at least one location. In some implementations, generate three-dimensional renderings of the first image based on the set of deformations. In some implementations, the mask image, when combined with the first image, indicates the at least one location in the first image. In some implementations, the mask image includes a first color or bit value to indicate regions of the first image not associated with the at least one object and a second color or bit value to indicate at least one region of the first image that is associated with the at least one object.

In some implementations, training platform 220 may determine whether a particular deformation is to be applied with regard to the mask image based on a type of the deformation, and may selectively apply the particular deformation based on determining whether the particular deformation is to be applied. In some implementations, training platform 220 may perform segmentation of the images using the deep learning network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
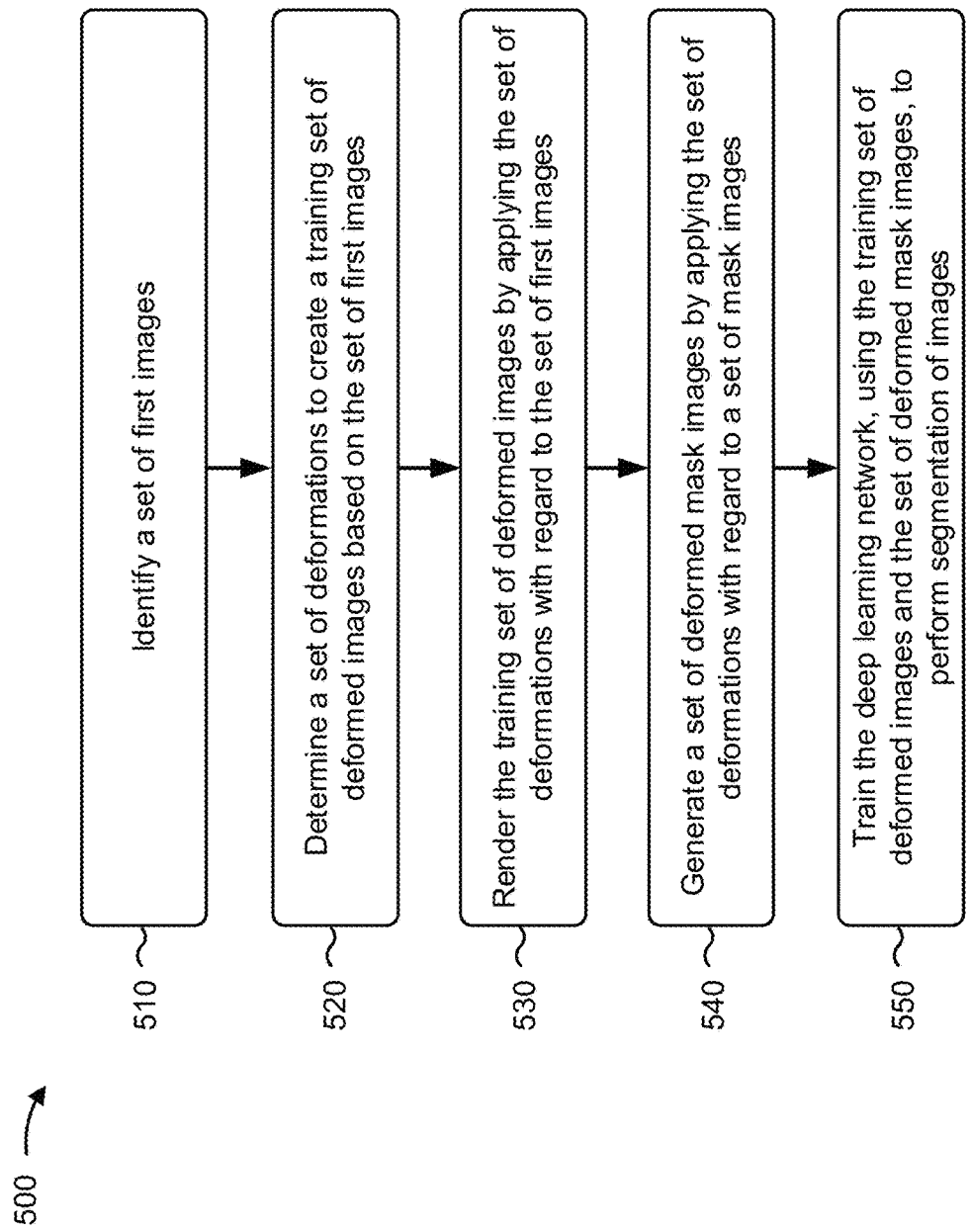
FIG. 5 is a flow chart of another example process for generating synthetic images as a training dataset for a machine learning network.

FIG. 5 is a flow chart of an example process 500 for generating synthetic images as a training dataset for a machine learning network. In some implementations, one or more process blocks of FIG. 5 may be performed by a training platform 220. In some implementations, one or more process blocks of FIG. 5 may be performed by another device or a group of devices separate from or including training platform 220, such as client device 210.

As shown in FIG. 5, process 500 may include identifying a set of first images (block 510). For example, training platform 220 (e.g., using processor 320 and/or the like) may identify (e.g., receive, obtain, generate, etc.) a set of first images. The set of first images may include target objects associated with locations in the set of first images. The set of first images may be associated with respective mask images that indicate the locations. For example, training platform 220 may receive the set of mask image with the set of first images, or may receive the set of mask images separately from the set of first images.

As shown in FIG. 5, process 500 may include determining a set of deformations to create a training set of deformed images based on the set of first images (block 520). For example, training platform 220 (e.g., using processor 320 and/or the like) may determine a set of deformations to be applied to the set of first images to create a training set. The training set may be used to train a deep learning network. For example, the deep learning network may perform segmentation of images to determine locations of objects in the images.

As shown in FIG. 5, process 500 may include rendering the training set of deformed images by applying the set of deformations with regard to the set of first images (block 530). For example, training platform 220 (e.g., using processor 320 and/or the like) may apply the set of deformations with regard to the set of first images. By applying the set of deformations with regard to the set of first images, training platform 220 may generate a training set of deformed images. For example, training platform may automatically render the training set based on the set of first images and using a rendering technique.

As shown in FIG. 5, process 500 may include generating a set of deformed mask images by applying the set of deformations with regard to a set of mask images (block 540). For example, training platform 220 (e.g., using processor 320 and/or the like) may apply the set of deformations with regard to the set of mask images. Thus, training platform 220 may generate a set of deformed mask images. In some implementations, training platform 220 may determine that a particular deformation is not to be applied for the set of mask images (e.g., based on the particular deformation having no effect on the set of mask image) and may accordingly not apply the particular deformation for the set of mask images. This conserves processor resources in comparison to applying the particular deformation for the set of mask images.

As shown in FIG. 5, process 500 may include training the deep learning network, using the training set of deformed images and the set of deformed mask images, to perform segmentation of images (block 550). For example, training platform 220 (e.g., using processor 320 and/or the like) may train a model, such as a deep learning network. Training platform 220 may train the model using a machine learning technique, such as a supervised learning technique. Training platform may train the model using the training set of deformed images and the set of deformed mask images. The model may perform segmentation of images.

Process 500 may include additional implementations, such as any single implementation or any combination of implementations described below.

In some implementations, the set of deformed mask images is used as a target attribute for the training set of deformed images when training the deep learning network. In some implementations, the training set of deformed images includes multiple, different deformed images generated based on a first image of the set of first images. In some implementations, a same deformation, of the set of deformations, is applied for a particular first image, of the set of first images, and for a particular mask image, of the set of mask images, that corresponds to the particular first image. In some implementations, multiple, different deformations are applied for a particular first image, of the set of first images, and for a particular mask image, of the set of mask images, that corresponds to the particular first image. In some implementations, the set of deformations includes at least one of: a spatial deformation, a changed lighting configuration, or a changed background.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, training platform 220 may improve accuracy of the deep learning network by automatically increasing a size of a training set for the deep learning network. Thus, processor resources of training platform 220 may be conserved that would otherwise be used to handle inaccurate results or uncertain determinations by the deep learning network. Furthermore, training platform 220 may increase the size of the training set with minimal human invention, and can create a training set of a size that would be difficult or impossible for a human actor to achieve (e.g., based on the volume of mask images that would have to be generated for the deformed images). For example, training platform 220 may automate a process of generating images and corresponding mask images, that was previously achieved by a human actor manually specifying relevant regions of the images, using a rigorous and technical approach (e.g., the automatic determination of deformations for an input image, the rendering of large sets of deformed images using those deformations, and the generation of corresponding mask images for the deformed images by applying the same deformations) that was not previously performed by a human actor or feasible for a human actor to perform.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
identifying, by a device, an image,
the image including a plurality of target objects, and
the image being associated with a plurality of mask images,
each mask image, of the plurality of mask images, being associated with a respective object, of the plurality of target objects;
determining, by the device, a set of deformations to create a training set of deformed images based on the image,
the set of deformations including a deformation of a background of the image;
generating, by the device, the training set of deformed images by applying the set of deformations with regard to the image;
generating, by the device, a set of deformed mask images by applying the set of deformations to the plurality of mask images,
each deformed image, of the training set of deformed images, being associated with a deformed mask image, of the set of deformed mask images, to identify at least one location corresponding to an object, of the plurality of target objects, in each deformed image; and
training, by the device, a model using the training set of deformed images and the set of deformed mask images.

2. The method of claim 1, wherein a mask image, of the plurality of mask images, is associated with multiple objects of the plurality of target objects.

3. The method of claim 1, further comprising:
receiving information regarding locations of the plurality of target objects in the image; and
generating, based on receiving the information, the plurality of mask images.

4. The method of claim 1, wherein determining the set of deformations comprises:
randomly or pseudorandomly selecting the set of deformations.

5. The method of claim 1, further comprising:
determining a type of the image; and
wherein determining the set of deformations comprises:
determining, based on the type of the image, the set of deformations.

6. The method of claim 1, further comprising:
determining whether to apply a particular deformation, of the set of deformations, to a particular mask image, of the plurality of mask images; and
wherein generating the set of deformed mask images by applying the set of deformations to the plurality of mask images comprises:
generating a particular deformed mask image, of the set of deformed mask images, by applying the particular deformation to the particular mask image.

7. The method of claim 1, further comprising:
receiving feedback;
adjusting a selection of the set of deformations based on the feedback; and generating another set of deformed mask images based on adjusting the selection of the set of deformations.

8. A device, comprising:
one or more memories; and
one or more processors communicatively coupled to the one or more memories, configured to:
identify an image,
the image including a plurality of target objects, and
the image being associated with a plurality of mask images,
each mask image, of the plurality of mask images, being associated with a respective object, of the plurality of target objects;
determine a set of deformations to create a training set of deformed images based on the image,
the set of deformations including a deformation of a background of the image;
generate the training set of deformed images by applying the set of deformations with regard to the image;
generate a set of deformed mask images by applying the set of deformations to the plurality of mask images,
each deformed image, of the training set of deformed images, being associated with a deformed mask image, of the set of deformed mask images, to identify at least one location corresponding to an object, of the plurality of target objects, in each deformed image; and
train a model using the training set of deformed images and the set of deformed mask images.

9. The device of claim 8, wherein a mask image, of the plurality of mask images, is associated with multiple objects of the plurality of target objects.

10. The device of claim 8, wherein the one or more processors are further configured to:
receive information regarding locations of the plurality of target objects in the image; and
generate, based on receiving the information, the plurality of mask images.

11. The device of claim 8, wherein the one or more processors, when determining the set of deformations, are configured to:
randomly or pseudorandomly select the set of deformations.

12. The device of claim 8, wherein the one or more processors are further configured to:
determine a type of the image; and
wherein the one or more processors, when determining the set of deformations, are configured to:
determine, based on the type of the image, the set of deformations.

13. The device of claim 8, wherein the one or more processors are further configured to:
determine whether to apply a particular deformation, of the set of deformations, to a particular mask image, of the plurality of mask images; and
wherein the one or more processors, when generating the set of deformed mask images by applying the set of deformations to the plurality of mask images, are configured to:
generate a particular deformed mask image, of the set of deformed mask images, by applying the particular deformation to the particular mask image.

14. The device of claim 8, wherein the one or more processors are further configured to:
receive feedback;

adjust a selection of the set of deformations based on the feedback; and generate another set of deformed mask images based on adjusting the selection of the set of deformations.

15. A non-transitory computer-readable medium storing instructions, the instructions comprising:
one or more instructions that, when executed by one or more processors, cause the one or more processors to:
identify an image,
the image including a plurality of target objects, and
the image being associated with a plurality of mask images,
each mask image, of the plurality of mask images, being associated with a respective object, of the plurality of target objects;
determine a set of deformations to create a training set of deformed images based on the image,
the set of deformations including a deformation of a background of the image;
generate the training set of deformed images by applying the set of deformations with regard to the image;
generate a set of deformed mask images by applying the set of deformations to the plurality of mask images,
each deformed image, of the training set of deformed images, being associated with a deformed mask image, of the set of deformed mask images, to identify at least one location corresponding to an object, of the plurality of target objects, in each deformed image; and
train a model using the training set of deformed images and the set of deformed mask images.

16. The non-transitory computer-readable medium of claim 15, wherein the one or more instructions, when executed by the one or more processors, further cause the one or more processors to:
receive information regarding locations of the plurality of target objects in the image; and
generate, based on receiving the information, the plurality of mask images.

17. The non-transitory computer-readable medium of claim 15, wherein the one or more instructions, that cause the one or more processors to determine the set of deformations, cause the one or more processors to:
randomly or pseudorandomly select the set of deformations.

18. The non-transitory computer-readable medium of claim 15, wherein the one or more instructions, when executed by the one or more processors, further cause the one or more processors to:
determine a type of the image; and
wherein the one or more instructions, that cause the one or more processors to determine the set of deformations, cause the one or more processors to:
determine, based on the type of the image, the set of deformations.

19. The non-transitory computer-readable medium of claim 15, wherein the one or more instructions, when executed by the one or more processors, further cause the one or more processors to:
determine whether to apply a particular deformation, of the set of deformations, to a particular mask image, of the plurality of mask images; and
wherein the one or more instructions, that cause the one or more processors to generate the set of deformed mask images by applying the set of deformations to the plurality of mask images, cause the one or more processors to:
generate a particular deformed mask image, of the set of deformed mask images, by applying the particular deformation to the particular mask image.

20. The non-transitory computer-readable medium of claim 15, wherein the one or more instructions, when executed by the one or more processors, further cause the one or more processors to:
receive feedback;
adjust a selection of the set of deformations based on the feedback; and
generate another set of deformed mask images based on adjusting the selection of the set of deformations.

* * * * *